(12) United States Patent
Koch et al.

(10) Patent No.: US 6,899,453 B2
(45) Date of Patent: May 31, 2005

(54) STATIC MIXER AND METHOD FOR MIXING A MAIN COMPONENT WITH AN ADDITIVE

(75) Inventors: Reto Koch, Mägenwil (CH); Reto Dohner, Zurich (CH)

(73) Assignee: Sika Schweiz AG, Zurich (CH)

( * ) Notice: Subject to any disclaimer, the term of this patent is extended or adjusted under 35 U.S.C. 154(b) by 110 days.

(21) Appl. No.: 10/381,493

(22) PCT Filed: Oct. 2, 2001

(86) PCT No.: PCT/IB01/01818
§ 371 (c)(1),
(2), (4) Date: Apr. 2, 2003

(87) PCT Pub. No.: WO02/32562
PCT Pub. Date: Apr. 25, 2002

(65) Prior Publication Data
US 2003/0185098 A1 Oct. 2, 2003

(30) Foreign Application Priority Data
Oct. 17, 2000 (CH) .............................................. 2037/00

(51) Int. Cl.$^7$ ................................................ B01F 5/08
(52) U.S. Cl. ................................... 366/174.1; 366/336
(58) Field of Search ................................ 366/336, 337, 366/338, 339, 348, 174.1, 175.2, 181.5

(56) References Cited

U.S. PATENT DOCUMENTS

| 1,637,697 A | * | 8/1927 | Jacobsen .................... 366/336 |
| 3,219,483 A | * | 11/1965 | Goos et al. .................. 366/337 |
| 3,773,098 A | * | 11/1973 | Rock ........................... 366/339 |
| 3,802,668 A | * | 4/1974 | Charles-Messance ....... 366/336 |
| 3,924,989 A | * | 12/1975 | Althausen et al. .......... 366/336 |
| 4,182,601 A |   | 1/1980 | Hill |
| 4,191,480 A | * | 3/1980 | Hiorth ........................ 366/336 |
| 4,309,160 A |   | 1/1982 | Poutanen et al. |
| 4,344,752 A | * | 8/1982 | Gallagher, Jr. .............. 366/336 |
| 4,408,890 A | * | 10/1983 | Beckmann .................. 366/339 |
| 4,753,535 A | * | 6/1988 | King .......................... 366/337 |
| 5,865,537 A | * | 2/1999 | Streiff et al. ................ 366/337 |

FOREIGN PATENT DOCUMENTS

| DE | 41 42 576 A1 | 6/1993 |
| EP | 0 337 719 A2 | 10/1989 |
| EP | 1 006 057 A1 | 6/2000 |
| SU | 1498623 A1 | 8/1989 |
| WO | WO 87/05258 | 9/1987 |

* cited by examiner

Primary Examiner—Tony G. Soohoo
(74) Attorney, Agent, or Firm—Oliff & Berridge, PLC

(57) ABSTRACT

The invention relates to a static mixer (1) having a cylindrical mixer channel formed by a mixer channel housing (5) and a multistage mixer blade element (3) which is disposed in said mixer channel and used for mixing layers of hardening accelerator paste in a stream of highly viscous PU. Discharge openings (7) are provided in the inlet area of the static mixer. Said discharge openings introduce a partial stream of hitherto unmixed highly viscous PU into. secondary channels (6) disposed parallel to the mixer channel. The secondary channels are connected to feeder openings (8) disposed in the wall of the mixer channel downstream of the mixer wing element (3) when viewed in the direction of flow. The unmixed PU is guided in the secondary channels (6) and enters the outer area of the stream coming from the mixer wing element via the feeder openings where the mixed layers of hardening accelerator paste are contained. The mixed stream is jacketed with a layer of unmixed PU to prevent layers of hardening accelerator paste from being discharged from an adhesive element applied with the aid of the mixer (1) and to prevent the occurrence of adhesive defects resulting therefrom.

7 Claims, 13 Drawing Sheets

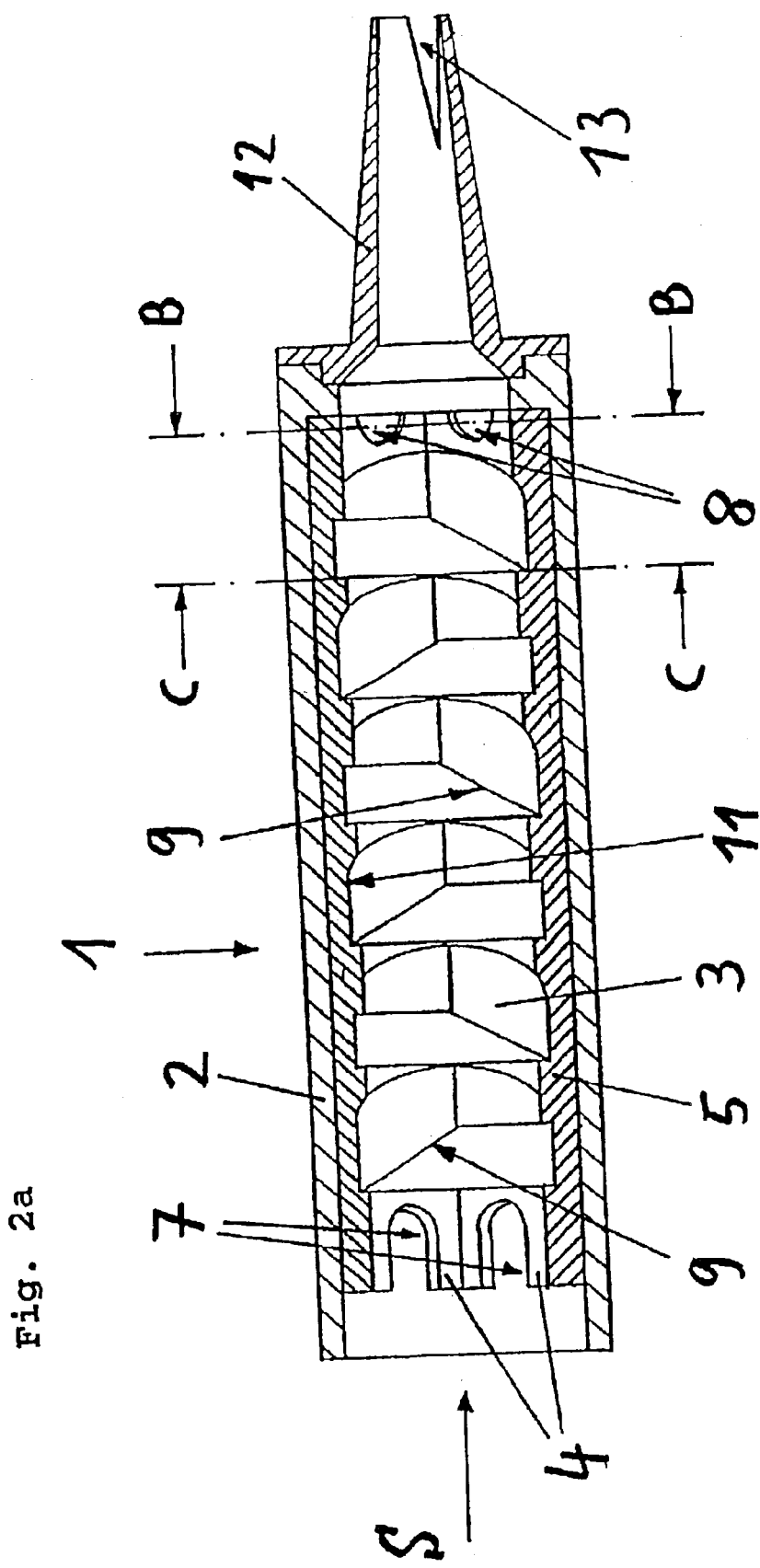

STATIC MIXER AND METHOD FOR MIXING A MAIN COMPONENT WITH AN ADDITIVE

REFERENCE TO RELATED APPLICATIONS

This application claims the priority of Swiss Patent application No. 2037/00 which was filed on Oct. 17, 2000, and the entire disclosure of which is incorporated herein by reference.

TECHNICAL FIELD

The present invention relates to a static mixer and components of such a mixer, the use of the static mixer and the components, as well as a method and the application of the method according to the preambles of the independent claims.

PRIOR ART

Static mixers are generally employed where two or more streams of free-flowing materials must be mixed together to create one completely or partially mixed combined free-flowing stream of material.

The application of static mixers to mix reactive components is known from the adhesives industry where these mixers have the function of both the essentially homogeneous mixing of multicomponent adhesives and the layered addition of hardening accelerators to single-component adhesives. Especially in this last use of static mixers for generating and applying adhesive beads, defective adhesive bonds often result since one or more of the added layers consisting of typically non-self-hardening hardening accelerators appear in the outer region of the adhesive bead and contact the bonding surface.

DESCRIPTION OF THE INVENTION

The goal of the invention is therefore to provide devices and applications of the devices, as well as method and applications of the methods, which do not have the referenced disadvantages of the prior art or eliminate them.

This goal is achieved by the subjects of the independent claims.

In a first aspect of the invention, the static mixer has a mixer channel housing forming a mixer channel and mixing means arranged in the mixer channel, such as swirl blades or vortexing bodies, to mix one main component with one or more additives that are reactive or nonreactive with the main component. In addition, the static mixer has external and/or internal feeder means flowing into the mixer channel to feed one or more streams of the unmixed main component, or an additional component, to the outer region of the completely or partially mixed mixing component stream coming from the mixing means. As a result, the mixed component stream is completely or partially jacketed by the added component, thereby reliably preventing any emanation of an undesired additive in the outer region of the mixed component stream. The addition of the jacketing component does not necessarily have to occur after the last mixing means but may take place earlier between two mixing means arranged sequentially and axially, viewed in the direction of flow, although the preferred approach involves the last mixer stages of a multistage mixing means. The main component here is preferably understood to be that component representing the greatest volumetric fraction of the mixed component stream and/or flowing through the inlet section of the mixer channel in the region of the wall.

In a second aspect of the invention, the mixer insert forming a static mixer according to the first aspect of the invention has a mixer channel housing forming the mixer channel, and one or more mixing means arranged within the mixer channel to mix a main component with one or more additives as they pass through the mixer channel and the mixing means. The mixer channel wall has one or more feeder openings extending radially outward through the mixer channel housing, or possibly through additional structural components belonging to the mixer insert, to feed the main component or an additional component to the outer region of the mixing component stream coming from the mixing means so as to partially or completely jacket the mixing component stream with the fed-in component. The feeder openings thus discharge to an outer surface of the mixer insert directly and radially, or indirectly through appropriate feeder channels. The result is that a static mixer of the above type with the advantages described may be created by using the mixer insert in combination with an appropriate housing. As already mentioned, the feed does not have to occur after the last mixing means, as is the case with the static mixer according to the first aspect, but may take place earlier between two mixing means arranged sequentially and axially in the direction of flow, the feed thus occurring in this case preferably in the region of the last mixer stage of a multistage mixing means.

A third aspect of the invention relates to a mixer channel housing to form a mixer channel for a static mixer according to the first aspect or for a mixer insert according to the second aspect, and to accommodate static mixing means in the mixer channel to mix a main component with one or more additives as they pass through the mixer channel and the mixing means located within this channel, the mixer channel forming the outer perimeter in the radial direction of the cross-section through which the mixing components flow, and the mixing means, preferably formed by a multistage mixer blade element with swirl blades, radially adjoining the mixer channel wall. The mixer channel wall has one or more feeder openings to feed one or more streams of unmixed main component or another component to the outer region of mixed component stream coming during operation from the mixing means arranged in the mixer channel. Here again, the feed does not have to take place after the last mixing means, but may, as in the static mixer according to the first aspect, occur earlier between two mixing means arranged sequentially and axially in the direction of flow, preferably, however, in the region of the last mixer stages of a multistage mixer. The arrangement of the mixer channel housing within an appropriate housing and the positioning of appropriate mixing means create a static mixer according to the invention according to the first aspect of the invention having the advantages already mentioned.

In a fourth aspect of the invention, the mixer channel extension, forming a static mixer according to the first aspect by arranging the mixer channel extension at the outlet of a static mixer used to mix a main component with one or more additives, has feeder means to feed one or more externally supplied streams of unmixed main components, or of an additional component, to the outer region of a completely or partially mixed mixing component stream coming from the upstream static mixer so as to partially or completely jacket the mixing component stream with the fed-in component. These feeder means discharge through one or more feeder openings in the inner wall of the mixer channel extension into the extended mixer channel formed by this extension. "Externally supplied" means that the fed-in component is conveyed by a conveying means located neither in the static mixer nor in the mixer channel extension. This means may be either the same or a different conveying means, such as a pump, used to convey the main component. By using the mixer channel extension described in combination with commercially available static mixers, a static mixer according to the invention, specifically according to the first aspect of the invention, may be created inexpensively.

A fifth aspect of the invention relates to a single-stage or multistage mixer blade element, for a static mixer according to the first aspect, to be located in a tubular mixer channel in which the mixer channel wall forms the outer perimeter in the radial direction of the cross-section through which the mixing material flows, and adjoins the mixer blades of the mixer blade element. The mixer blade element preferably functions to form a static mixer according to the first aspect of the invention. The mixer blade or blades of at least one mixer stage of the mixer blade element have passages in the region provided to adjoin the wall of a mixer channel accommodating the mixer blade element, the passages running from the front side to the back side of the blades, which passages serve as a bypass channel for a partial stream of one of the mixing materials around the respective mixer blade. Another conceivable approach would be for the mixer blade or blades radially to adjoin the inner wall of the mixer channel simply by radial support elements such as support ribs, thereby forming bypass channels between the mixer blade and the inner wall that are either circumferentially open or circumferentially closed. It has been found that in many static mixers a complete mixing extending to the outer region of the material stream is achieved only during passage through the last mixer stage—with the result that usually an unmixed material flow is present in the wall region of the mixer channel of the last mixer stage, from which flow a partial stream may be introduced into the outer region of the mixer stream coming from the last mixer blade element stage to jacket this stream. By using the proposed mixer blade elements in combination with simply designed mixer channel housings, a static mixer according to the invention, specifically according to the first aspect of the invention, may be created inexpensively.

In a sixth aspect of the invention, the static mixer according to the first aspect, the mixer insert according to the second aspect, the mixer channel housing according to the third aspect, the mixer channel extension according to the fourth aspect, or the mixer blade element according to the fifth aspect of the invention, is used to process highly viscous single-component adhesives with reactive additives, specifically, to process highly viscous PU with a hardening accelerator paste. The advantages of the invention are especially evident during processing.

In a seventh aspect of the invention, a method of forming a material stream from a main component mixed completely or partially with one or more additives, wherein the material stream is jacketed partially or completely by unmixed main component or an additional component, comprises the steps mixing a main component stream with one or more streams of one or more reactive or nonreactive additives using a static mixer located in a mixer channel to form a completely or partially mixed mixing component stream, and feeding one or more streams of unmixed main component or of an additional component within the mixer channel to the outer region of the completely or partially mixed mixing component stream so as to form a complete or partial jacket of the mixing component stream from unmixed main component and the additional component. As a result, any additive added to the main component is prevented from emerging into the outer region of the mixing component stream, and a mixing component stream may be generated, the outer region of which has a precisely defined material composition.

In a last aspect of the invention, the method according to the seventh aspect of the invention is applied to generate an adhesive bead with a core of PU having a hardening accelerator paste added in by layers, and with a jacket of PU that is as thin as possible to adhesively bond components, especially automotive components in the automobile industry.

BRIEF DESCRIPTION OF THE DRAWINGS

Additional preferred embodiments of the invention are found in the dependent claims and in the following description based on the figures.

FIG. 2a is a longitudinal section through another static mixer to be attached using a coupling sleeve;

APPROACHES TO IMPLEMENTING THE INVENTION

Figure 1A:
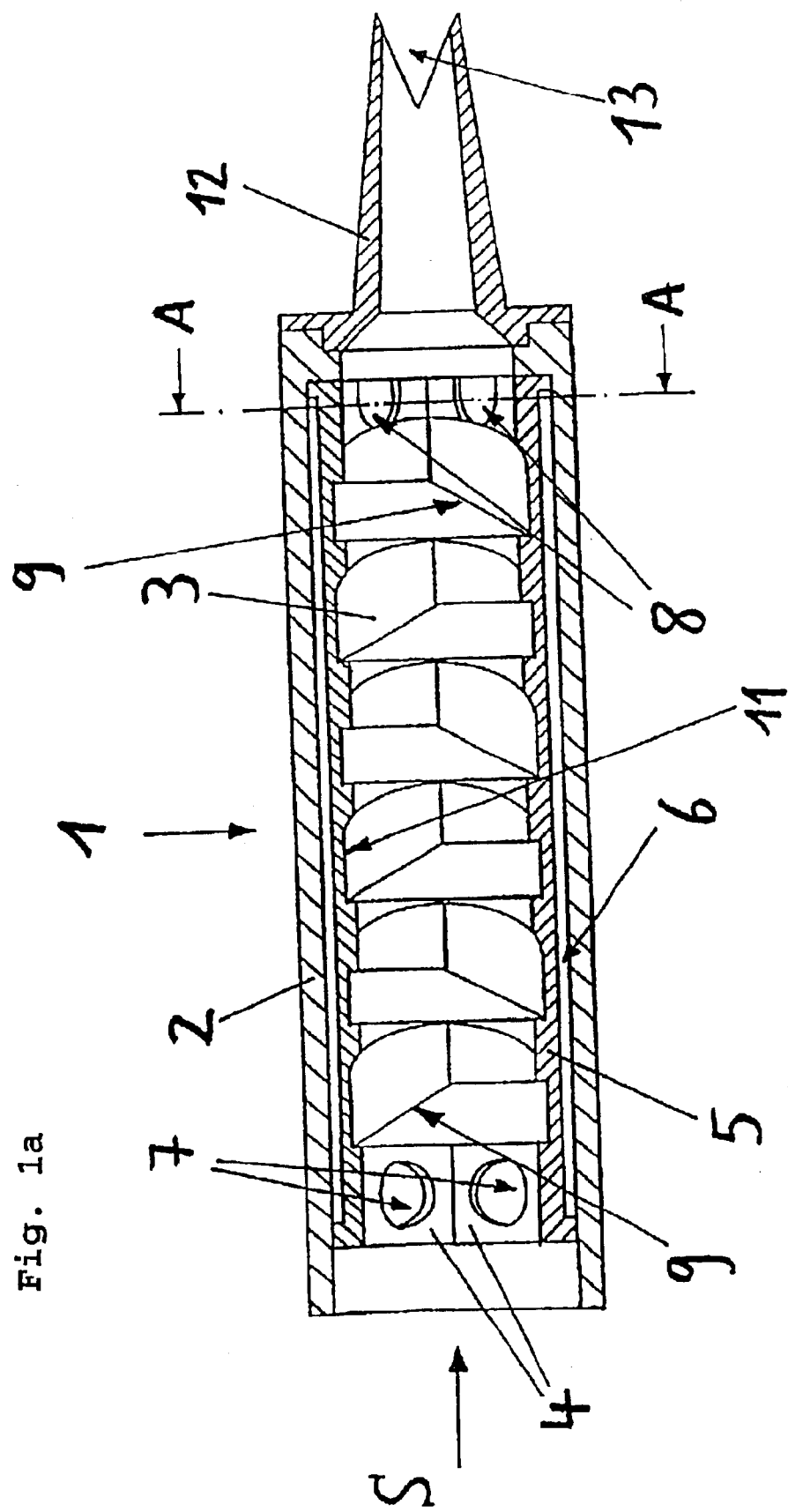
FIG. 1a is longitudinal section through a static mixer to be attached using a coupling sleeve.

The basic design of a preferred embodiment of the invention is illustrated in FIG. 1a which shows a longitudinal section through a static mixer 1. The mixer 1 shown is used preferably in the automotive industry for the layered addition of a hardening accelerator paste to highly viscous PU, the mixer being attached by a coupling sleeve at the outlet of a feeder line from which a main component stream of highly viscous PU is discharged, to the center of which hardening accelerator paste is added through a nozzle to the PU stream. As the figure shows, static mixer 1 consists of a housing section 2 with a cylindrical bore that encloses a multi-piece mixer insert, the insert consisting of a mixer channel housing 5 formed from two half shells 4 and forming a cylindrical mixer channel, and of a multistage one-piece mixer blade element 3 located in the mixer channel.

Figure 1B:
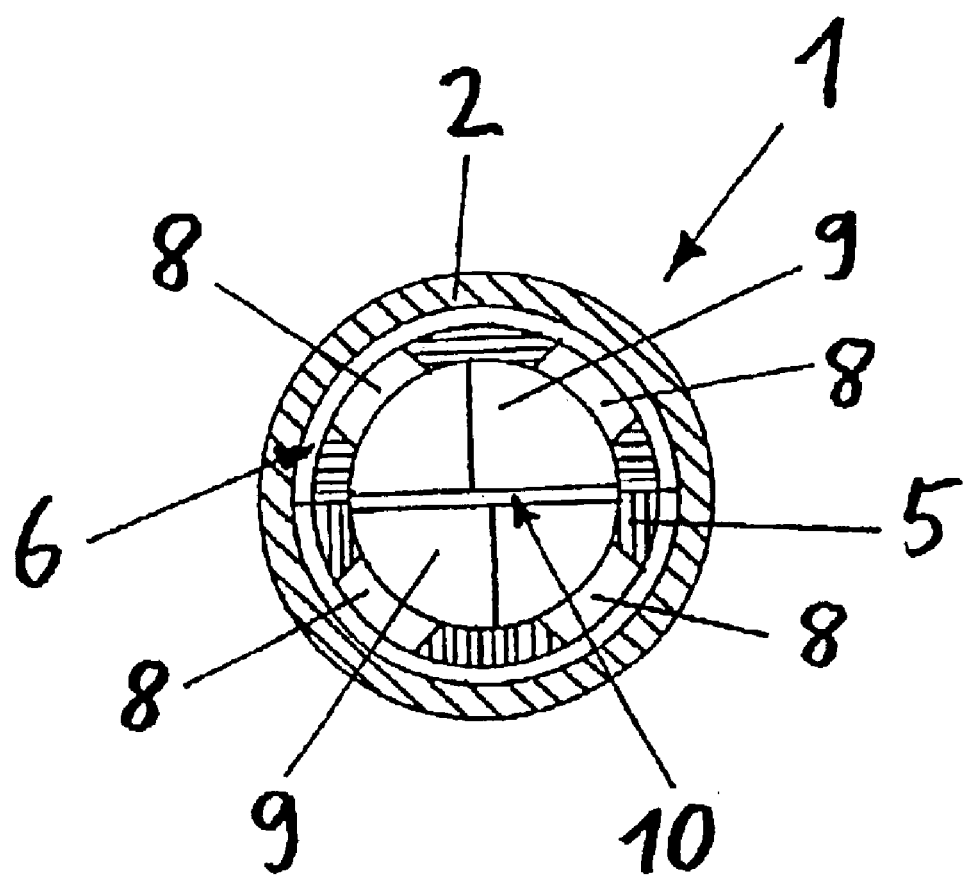
FIG. 1b is a section through the static mixer of FIG. 1a along line A—A.

As is evident in FIGS. 1a and 1b which show a section along line A—A in FIG. 1a, mixer channel housing 5 has a stepped, cylindrical external contour, with the diameter of the bore accommodating mixer channel housing 5 only at its ends. The result is an annular gap along almost the entire axial extent of the mixer channel between mixer channel housing 5 and housing section 2, which gap forms a coaxial secondary channel 6 to the mixer channel. At the inlet end of the mixer channel, annular gap 6 is connected by four circular passages 7 in the mixer channel wall which extend radially through mixer channel housing 5, are located before mixer blade element 3, viewed in the direction of flow S, and are distributed uniformly around the perimeter of the mixer channel, which passages function as discharge openings 7 for unmixed PU with a core of hardening accelerator paste from the outer region of the PU stream entering mixer blade element 3 at the inlet section of the mixer channel. In other words, an unmixed main component stream is discharged through discharge openings 7 from the stream of main component and additive flowing within the mixer channel. Located axially in the direction of flow S directly after the last mixer stage of mixer blade element 3, the mixer channel has four oblong-hole-like passages 8 distributed uniformly around the perimeter of the mixer channel and extending radially through mixer channel housing 5, which passages discharge into the annular secondary channel 6 and serve as feeder openings 8 for unmixed PU from secondary channel 6 into the outer region of mixing component stream coming from the last mixer stage of mixer blade element 3. In the case shown, both discharge openings 7 and feeder openings 8 are located in the area of the ends of the mixer channel, the feeder openings 8 in form of oblong holes in mixer channel 5 are open in the axial direction facing the end closest to them of mixer channel housing 5, and are delimited in this direction by a stop collar in the bore of housing section 2 supporting mixer channel 5 axially in the direction of flow S. At each of its six mixer stages, mixer blade element 3 has two identical swirl blades 9, each extending 90 degrees around the central mixer channel axis, the slopes of which blades are separated by spacers 10. Mixer blade element 3 is designed such that the swirl blades 9 radially adjoin the mixer channel wall and such that axially sequential swirl blades 9 have an opposing swirl direction D. A mixer blade element 3 of this type is commercially available as a one-piece, plastic injection-molded part and is thus available in an extremely inexpensive form. As is also evident in the sectional illustration of FIG. 1a, which provides a sectional view of mixer channel housing 5 whereas mixer blade element 3 is shown in a non-sectional view, the mixer channel wall has recesses 11 in the outer contours of the individual swirl blades 9 of mixer blade element 3 and which effect an axial form fit between individual swirl blades 9 and mixer channel housing 5. This feature is especially advantageous in the here preferred application of the static mixer to mix highly viscous materials since it is able to prevent compression of the mixer blade element 3 from the high flow pressures and thus any undefined mixer geometry caused by such pressures—with the resulting poor or undefined mixing results. As is also evident, static mixer 1 has an application nozzle 12 at its outlet end with a triangular notch 13 in the nozzle wall which is sharply tapered from the nozzle tip against the direction of flow S.

When the mixer 1 in FIGS. 1a and 1b is connected to a feeder connector and a stream of highly viscous PU with one or more cores of hardening accelerator paste is fed through this connector, then the largest fraction of this total stream passes through the mixer channel and mixer blade element 3 located within the mixer channel. Due to this arrangement and geometry of swirl blades 9, a mixing component stream comes from the last mixer stage that consists of PU with hardening accelerator paste which is layered and radially mixed out to the edge. At the same time, a partial stream of unmixed PU is introduced into the annular secondary channel 6 at the inlet section of the mixer channel through discharge openings 7 in the mixer wall and this flow is guided outside the mixer channel around mixer blade element 3. In this region in which the mixing component stream comes from mixer blade element 3, the partial stream of unmixed PU directed through secondary channel 6 is introduced through feeder openings 8 into the outer region of the mixing component stream. As a result, the mixing component stream is jacketed with unmixed PU, at least in the regions in which layers of added hardening accelerator paste extend through to its outer region, such that the adhesive stream coming from application nozzle 12 has exclusively unmixed PU at its surface, while in its interior the stream consists of PU interspersed with thin layers of hardening accelerator paste. If mixer 1 with its nozzle 12 is oriented essentially vertically to an application surface and moved along the application surface in a direction opposite triangular notch 13, an adhesive bead with a triangular cross-section and with the design described earlier may be applied to the surface.

FIG. 2a shows another static mixer 1 with a design similar to mixer 1 in FIG. 1a. Mixer 1 shown here also has a housing section 2, a mixer insert comprising a mixer channel housing 5 forming the mixer channel, and a mixer blade element 3, and an application nozzle 12 with a triangular notch 13. This mixer 1 is also designed to be attached by a coupling sleeve or by an additional housing section to a feeder line. Unlike the previously described static mixer 1, the discharge openings 7 here are designed as oblong holes 7 in the mixer channel wall which are open axially toward the closest end of mixer channel housing 5, these holes being, however, delimited by a collar of the upstream feeder line axially adjacent to mixer channel housing 5. The feeder openings 8 are here designed as radial openings with a cross-section in the shape of a segment of a circle. It is evident that the cross-section of discharge openings 7 is significantly larger that that of feeder openings 8, this feature keeping the pressure drop as low as possible during diversion of the PU partial stream.

Figure 2B:
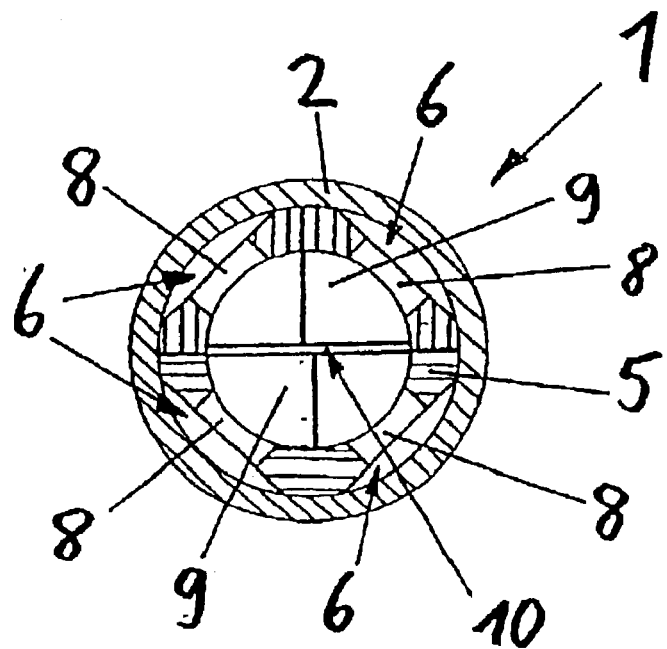
FIG. 2b is a section through the static mixer of FIG. 2a along line B—B.

As is evident in FIG. 2b which is a section along line B—B of FIG. 2a, the mixer insert of this embodiment has an external contour which is formed by a cylinder with four flattened areas uniformly distributed around its perimeter extending in the axial direction. This design creates four secondary channels 6 with a circular-segment-shaped cross-section running parallel to the mixer channel axis along the entire axial extension of the mixer insert, or of mixer channel housing 5, between mixer channel housing 5 and housing section 2, which channels serve to convey a PU partial stream between each discharge opening 7 and feeder opening 8. In other words, exactly one discharge opening 7 and one feeder opening 8 each discharge to a common outer surface of mixer channel housing 5 formed by the flattened areas and parallel to the mixer channel axis. This design thus creates multiple mutually independent secondary channels 6 with associated discharge openings and feeder openings 7, 8—a feature that enhances the operational reliability of mixer 1 in the event of a blockage of channel 6 by any unintended hardening of a PU partial stream in channel 6, for example, during a down period in operation. A similar result could be achieved by axial grooves along an otherwise cylindrical outer contour of mixer channel housing 5. If in fact two or even multiple separate secondary channels 6 are used to feed a common feeder opening 8, then the operational reliability may be enhanced still further.

Figure 2C:
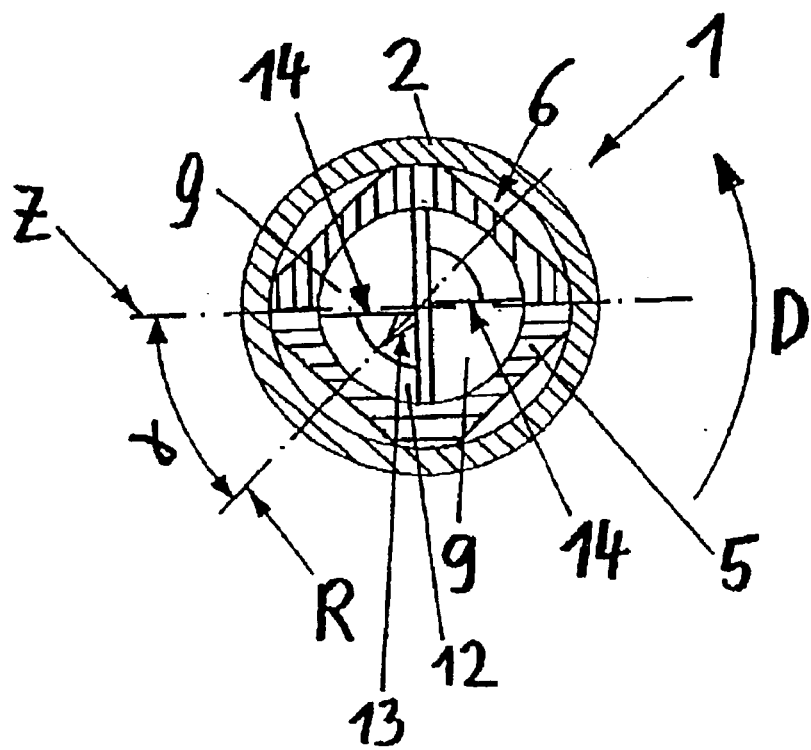
FIG. 2c is a section through the static mixer of FIG. 2a along line C—C.

As is evident in FIG. 2c, which shows a section along line C—C of FIG. 2a, the swirl blades 9 arranged finally in a common axial position within the mixer channel in the direction of flow S, that is the swirl blades 9 of the last mixer stage of mixer blade element 3, form a swirl blade pair such that the outlet edges 14 of swirl blades 9 essentially join to form a line Z that passes through the center of the mixer channel. In the case shown, the swirl blade pair and application nozzle 12 are aligned relative to one another so as to create an angle α of 45° between line Z formed by the swirl blade outlet edges 14, and a radial line R through the center of triangular notch 13 of nozzle 12, this angle α opening against the swirl direction D of the swirl blade pair starting from radial line R. It has been found that this approach enables an especially advantageous arrangement of the hardening accelerator paste layers to be obtained in an adhesive bead applied with nozzle 12—with the result that even after a total malfunction of secondary channels 6, at least gross adhesive defects due to emergence of hardening accelerator layers can be avoided in the region of the adhesive bead that forms a direct contact surface with the bonding surfaces.

Figure 3A:
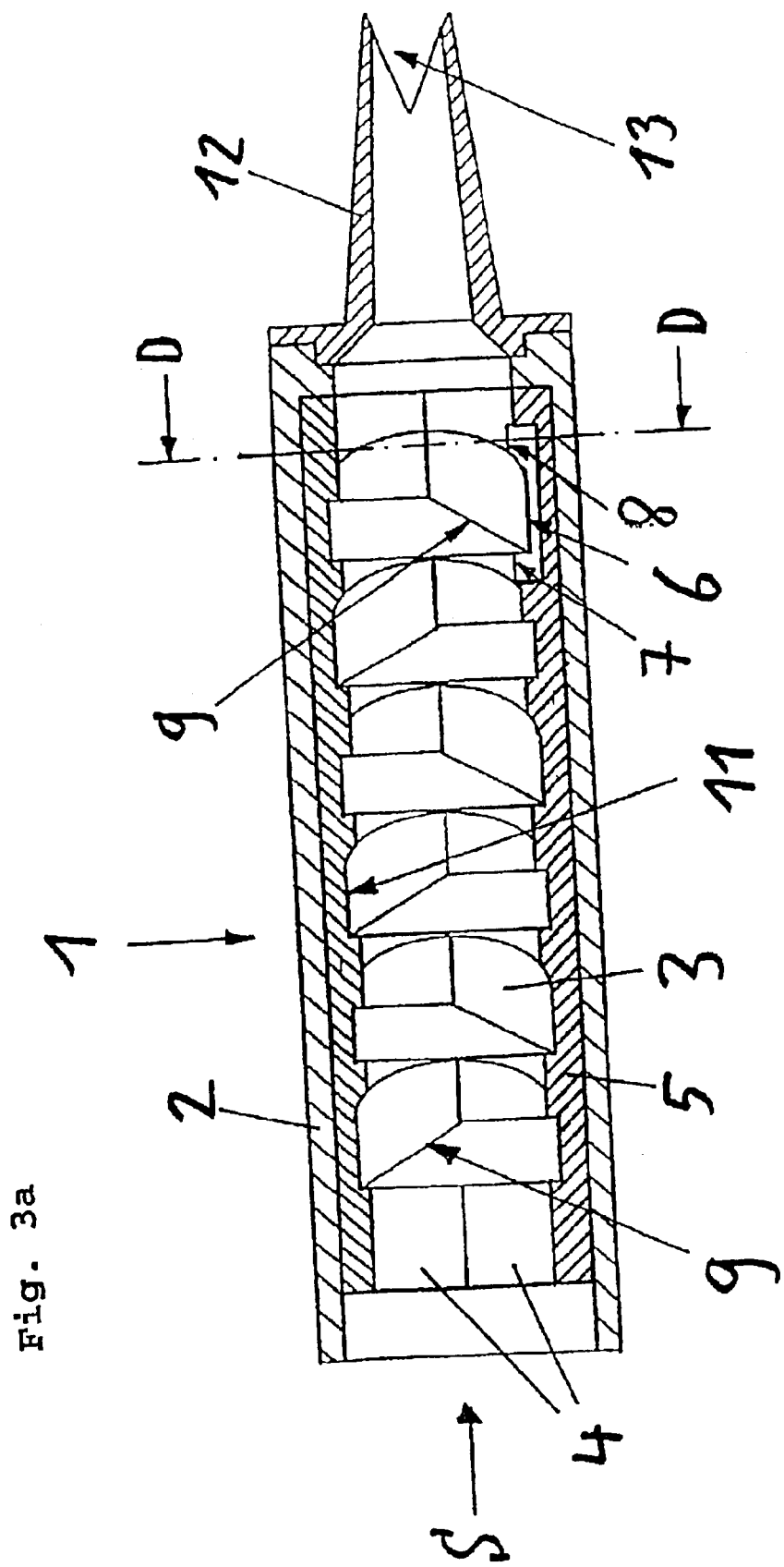
FIG. 3a is a longitudinal section through another static mixer to be attached using a coupling sleeve.

FIG. 3a shows another static mixer 1 which consists essentially of the same components as static mixer 1 in FIGS. 1a and 2a. Unlike the previously described static mixer 1, however, the two-part mixer channel housing 5 formed from two half shells 4 has a cylindrical outer contour which precisely matches the contour of the inner wall of the bore in housing section 2 accommodating half shells 4 such that no gap of any significant cross-section is present between these contours. In addition, the mixer channel wall does not have any passages 7, 8 extending radially outward through mixer channel housing 5, for the discharge and/or feed of an unmixed PU partial stream. In the example shown, housing section 2 and mixer channel housing 5 thus do not form a secondary channel to convey unmixed PU, as was the case in the previous examples.

Figure 3B:
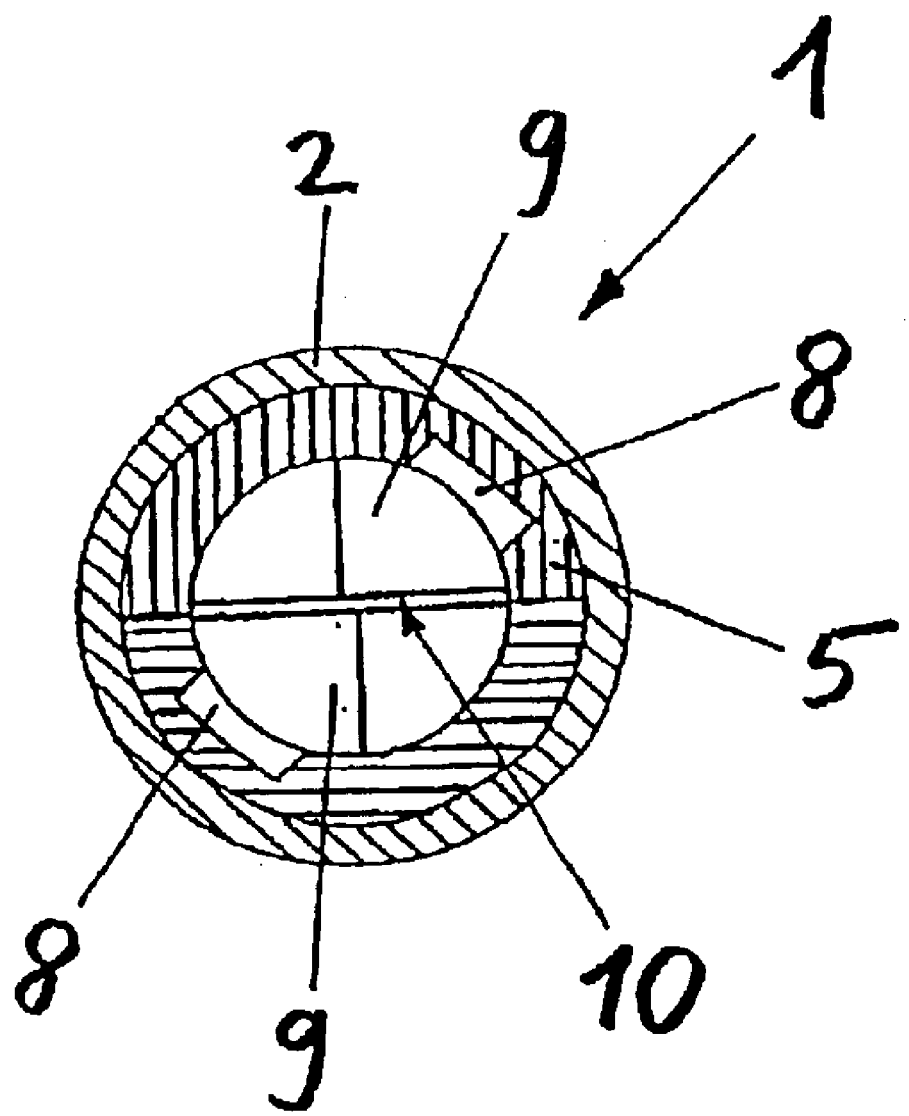
FIG. 3b is a section through the static mixer of FIG. 3a along line D—D.

As is evident in FIG. 3a in conjunction with FIG. 3b which is a section along line D—D in FIG. 3a, the mixer channel wall has two grooves 6 extending parallel to the mixer channel axis in the region of the last mixer stage, which grooves, together with the two swirl blades 9 of this stage radially adjoining the mixer channel wall, form two secondary channels 6 surrounding these swirl blades 9. Another conceivable approach would be to incorporate pockets in place of grooves 6 in the inner wall of the mixer channel that typically have a greater span in the circumferential direction, for example, a circumferential span of 90°. The axial extent of grooves 6 is such that they extend beyond the range of the respective swirl blades 9 in the wall region, both in the direction of flow S and against the direction of flow S, and as a result, form a discharge opening 7 before the respective swirl blade 9, and a feeder opening 8 after this swirl blade. The mixer channel wall is thus designed such that it has bypass channels 6 to divert partial streams of the PU materials flowing in the region of the mixer channel wall around mixer blade 9 of the last stage of mixer blade element 3. If the number of mixer stages is designed such that hardening accelerator paste is added only during passage through the last mixer stage, there remains a flow of unmixed PU in the wall region before the last swirl blade pair, from which flow partial streams are introduced through discharge openings 7 into secondary channels 6, and from there are fed through feeder openings 8 located directly behind the respective swirl blades 9 to the outer region of the stream of PU with layer-by-layer-added hardening accelerator paste coming from the last mixer blade element stage. The radial position of channels 6 or of feeder openings 8 is preferably selected such that the PU feed occurs in that region in which layers of hardening accelerator paste advance into the outer region of the mixing stream.

Figure 4A:
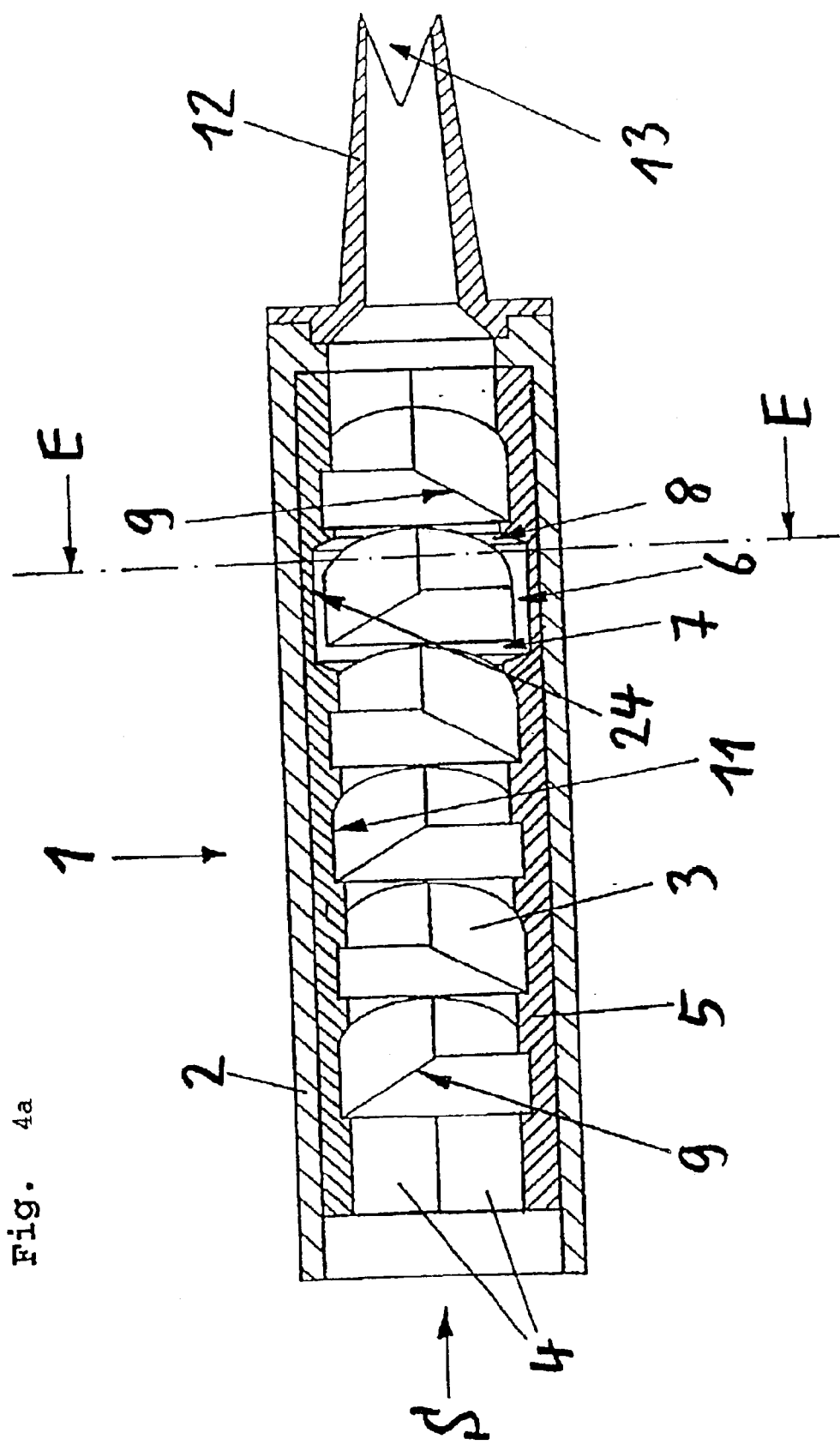
FIG. 4a is a longitudinal section through another static mixer to be attached using a coupling sleeve.
Figure 4B:
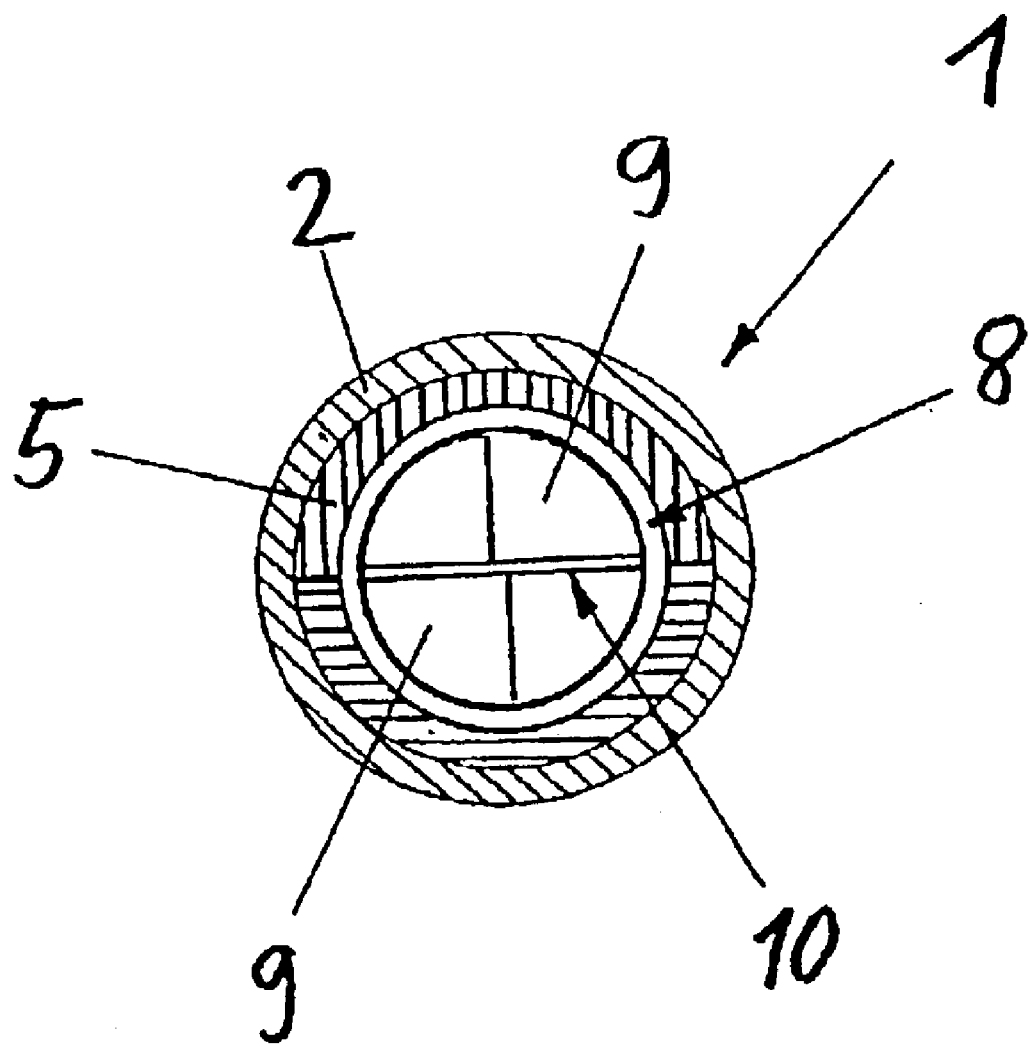
FIG. 4b is a section through the static mixer of FIG. 4a along line E—E.

FIG. 4a shows another static mixer 1 of essentially the same design as the static mixer shown in FIGS. 3a and 3b. As is evident in FIGS. 4a and 4b which show a section along line E—E, the mixer channel wall of mixer 1 shown here, unlike the mixer shown previously, has a recess 24 extending around the perimeter of its interior which is axially positioned to form annular circumferential gaps 6 in the region of the radial interface of swirl blades 9 in the penultimate mixer stage of mixer blade element 3 together with the radial delimitations of these swirl blades 9. In addition, the axial span of recess 24 is such that a corresponding discharge opening 7 is formed directly before each respective swirl blade, while a corresponding discharge opening 7 is formed directly behind the blades, with the result that the penultimate mixer stage in the case shown is retained only by the antepenultimate and the last mixer stage, and positioned within the mixer channel. In the peripheral regions where no swirl blades are located, recess 24 forms the outer perimeter in the radial direction of the cross-section traversed by all the components. If the number of mixer stages is set so that during passage through the antepenultimate mixer stage no hardening accelerator paste has as yet been added in the outer region, a flow of unmixed PU is still located in the wall region before the penultimate mixer stage, which flow in this case is guided as a closed enveloping flow around the penultimate mixer stage, whereby care must be taken that the thickness of this enveloping flow is great enough to reliably prevent any advance of the hardening accelerator paste into the outer region of the mixing stream even after passing the last mixer stage.

Figure 5A:
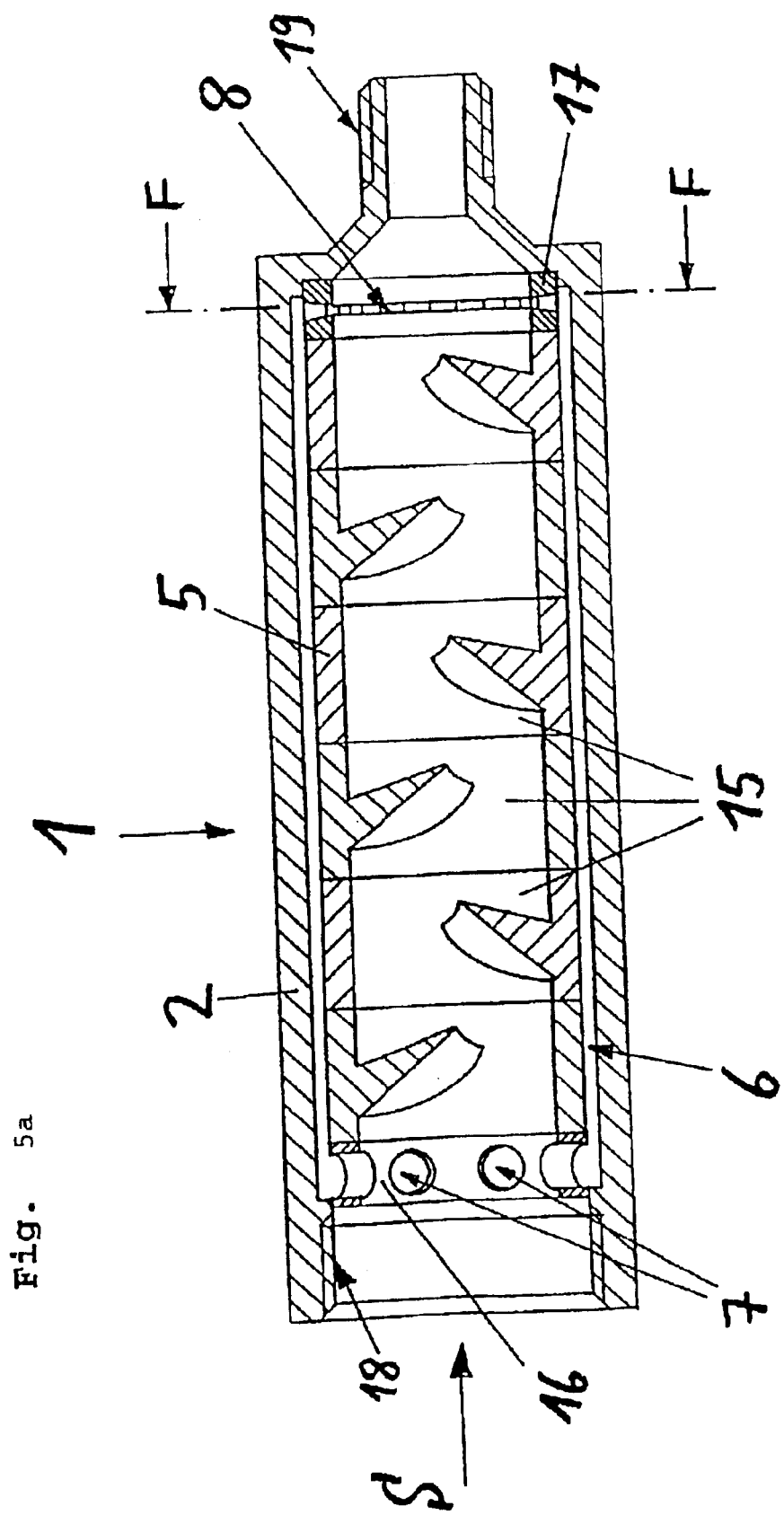
FIG. 5a is a longitudinal section through a static mixer to be screw-mounted onto a threaded connector.

FIG. 5a shows a longitudinal section through a static mixer 1 in which the mixer channel and mixing means are formed by one-piece, sequentially arranged single-stage mixer blade elements 15 with a cylindrical outer contour. A perforated ring 16 with eight radial holes 7 distributed uniformly around its perimeter is located before the first mixer element segment 15, viewed in the direction of flow S. A annular nozzle 17 consisting of two rings separated by support webs is located after the last mixer element segment, viewed in the direction of flow S. The inside diameters of perforated ring 16 and of annular nozzle 17 match the diameter of the mixer channel section formed by mixer element segments 15, while their outside diameters match the outside diameters of mixer element segments 15. Nozzle ring 17, mixer element segments 15, and perforated ring 16 are located in an opening in mixer housing 2.

Figure 5B:
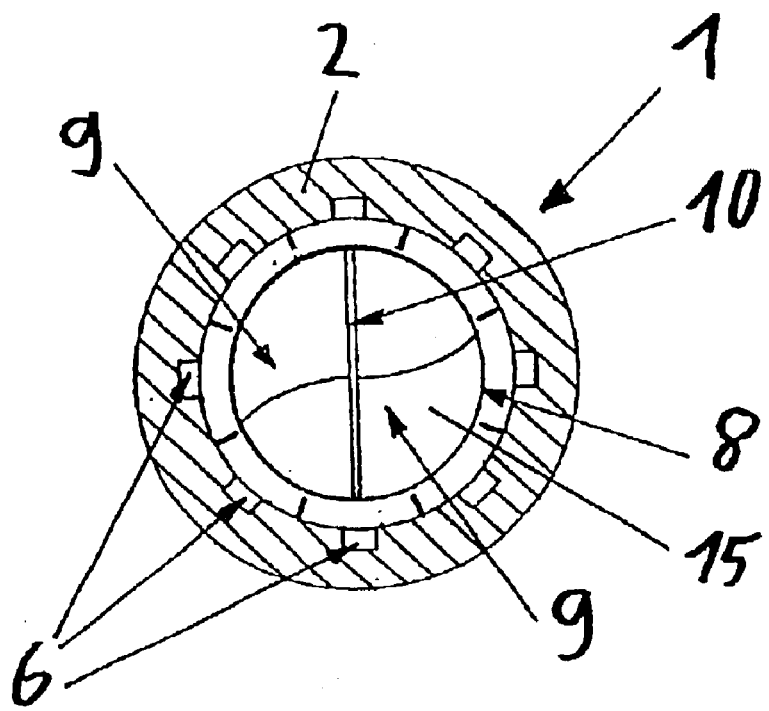
FIG. 5b is a section through the static mixer of FIG. 5a along line F—F, the mixer having single-stage mixer element segments with two swirl blades each.
Figure 5C:
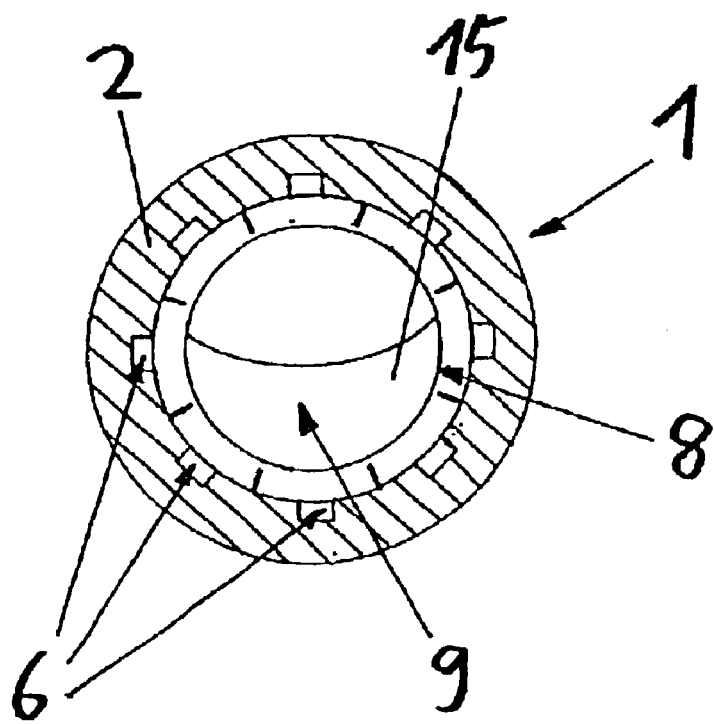
FIG. 5c is a section through the static mixer of FIG. 5a along line F—F, the mixer having single-stage mixer element segments with one mixer blade each.

As is shown in FIG. 5b, which is a section along line F—F in FIG. 5a, this opening in housing 2 is a cylindrical bore with an inside diameter that is essentially the same as the outer diameter of nozzle ring 17, of mixer element segments 15, and of perforated ring 16. The inner wall of the bore in housing 2 has eight axial grooves 6 distributed uniformly around the perimeter of the bore, which grooves function as secondary channels 6 parallel to the mixer channel axis conveying unmixed PU and are each fed by one of the eight holes of perforated ring 16 which function as discharge openings 7. Axial grooves 6 terminate in nozzle ring 17, whose opening 8 serves as a feeder opening 8 to feed unmixed PU to the outer region of the mixing stream coming from the last mixer element segment 15 such that this stream is completely jacketed by a thin layer of unmixed PU. The single-stage mixer element segments 15 in FIG. 5b have two identical swirl blades 9, the slopes 9 of which are separated by a spacer 10. Unlike FIG. 5b, FIG. 5c shows the mixer of FIG. 5a in a sectional view along line F—F with single-stage mixer element segments 15 which each have only a single mixer blade 9.

As is evident in FIG. 5a, the mixer housing 2 in the static mixer shown here has an internal thread 18 at its inlet to attach mixer 1 to the threaded connector of a feeder device such as a PU-conveying pipe with a central nozzle for hardening accelerator paste. The threaded connector of the feeder element screwed into internal thread 18 preferably has a collar that presses perforated ring 16, mixer element segment 15, and nozzle ring 17 axially against each other when mixer 1 is screwed onto the connector. In addition, the feeder channel of a suitable threaded connector preferably has the inside diameter of perforated ring 16, thereby preventing any unwanted disturbances to the flow in the inlet section of the mixer channel. The outlet end of mixer 1 forms a threaded connector 19 to attach an application nozzle 12, or a transfer element such as a conveyor line, to static mixer 1.

Figure 6:
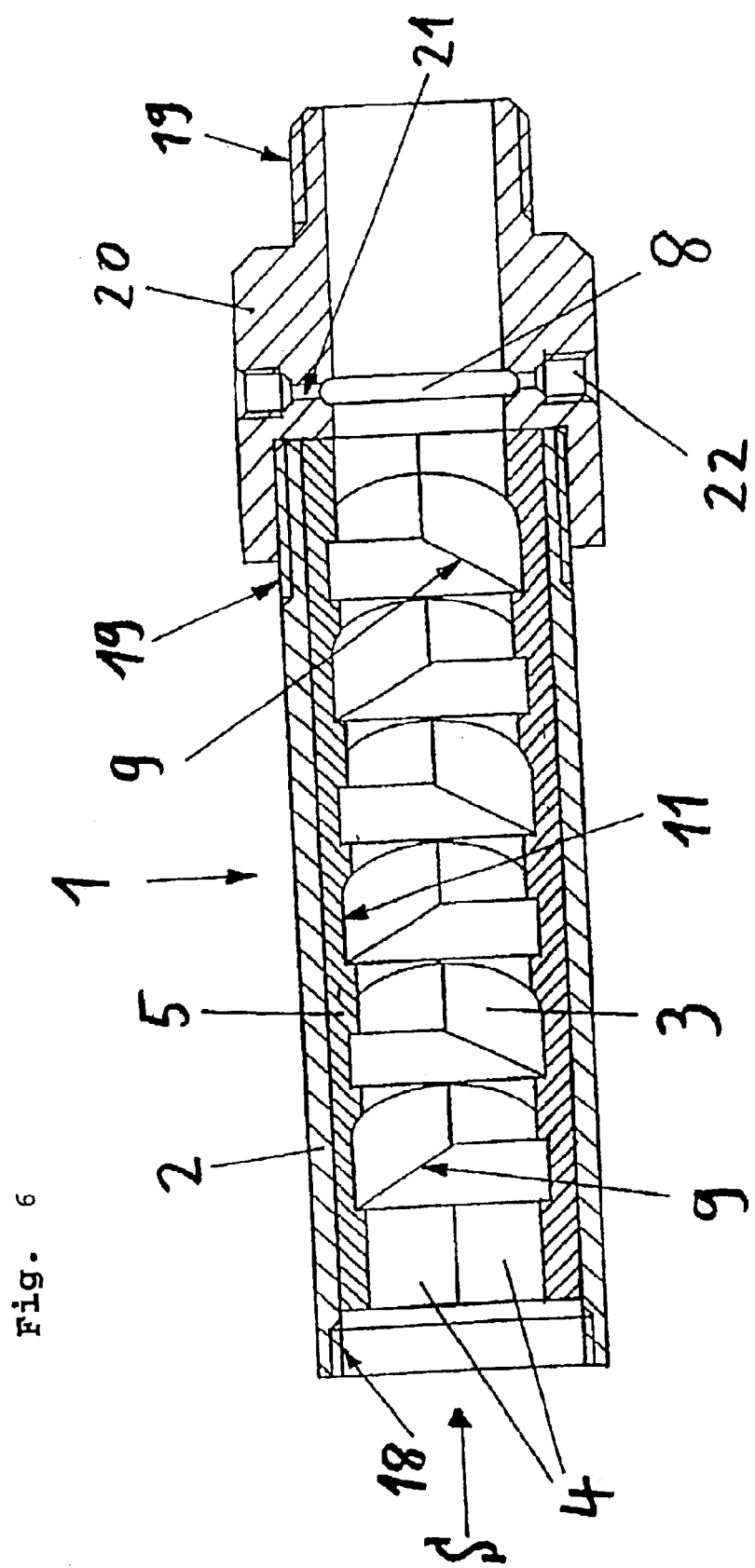
FIG. 6 is a longitudinal section through a static mixer to be screw-mounted onto a threaded connector with a mixer channel extension separate from the mixer insert.

FIG. 6 is a longitudinal section through a static mixer 1 with a mixer channel extension 20 located at the mixer outlet to feed a material to jacket the material stream coming from mixing means 3, 9. The static mixer has a mixer insert, the mixer channel housing 5 of which is formed by two half shells 4, as is the case with the static mixers of FIGS. 1a through 4a, within which the mixer blade element 3 known from these figures is arranged in the manner already described. The outer contour of mixer channel housing 5 is cylindrical. The two mixer channel half shells 4 are enclosed and held together by a cylindrical mixer housing 2 which has an internal thread 18 at the inlet end to connect mixer 1 to a feeder connector. Here too, the design provides that during operation the feeder connector forms a collar axially abutting half shells 4 and that the feeder channel of the connector has approximately the same inside diameter as the mixer channel. At the outlet end, mixer housing 2 has an external thread 19 and a separate mixer channel extension 20 screwed on to this thread, which extension in turn has a threaded connector 19 at its outlet end to attach transfer elements such as nozzles 12 or transfer lines. Mixer channel extension 20 in this case continues the mixer channel cross-section up to threaded connector 19. According to the invention, however, the mixer channel is also tapered within mixer channel extension 20 toward its outlet. As the illustration shows, the mixer channel wall of mixer channel extension 20 has a circumferential groove 8 with a semicircular cross-section that is connected to holes 21 leading radially outward and which functions as feeder opening 8 for a jacketing material fed through holes 21 to the outer region of the mixing stream coming from mixer blade element 3. If the function of mixer 1, as in the previous examples, is the layered addition of hardening accelerator paste to a stream of highly viscous PU, then the holes are preferably used to feed unmixed PU. Another conceivable approach, however, is to add another component to form the outer region of the material stream coming from mixer channel extension 20. This approach is possible specifically for the reason that an external feed of material is enabled by the design shown, and therefore it is not necessary to have a material in the form of a jacketing material entering the mixer. Even if, in this case, the feeder opening 8 is a circumferential groove 8 which enables complete jacketing, the design also provides for placing multiple openings 8 which are radially not completely circumferential around the periphery of the mixer channel such that a partial jacketing of the material stream, or covering of the emanating additive layers, occurs only at positions in which fed-in additive layers enter the outer region of the mixing stream coming from the last mixer stage. In this case, it is critically important to ensure the shortest possible axial distance and a defined radial positioning between the last mixer stage and feeder openings 8. As is also evident in FIG. 6, the radial feeder openings 21 each have an internal thread 22 at their outwardly facing ends to connect feeder lines for the jacketing material. Even though internal thread 22 is employed here, in general any known connecting means is also appropriate which ensures an essentially tight connection between feeder channel 21 and the external material feed, for example, threaded connectors with an external thread, bayonet connectors, quick-coupling connectors, etc. In addition, the design also provides for a similar arrangement with an integrated mixer housing 2 or mixer channel housing 5 and mixer channel extension 20, thereby creating a static mixer 1 with an extended mixer channel outlet that has feeder means for the external feed of jacketing material.

Figure 7:
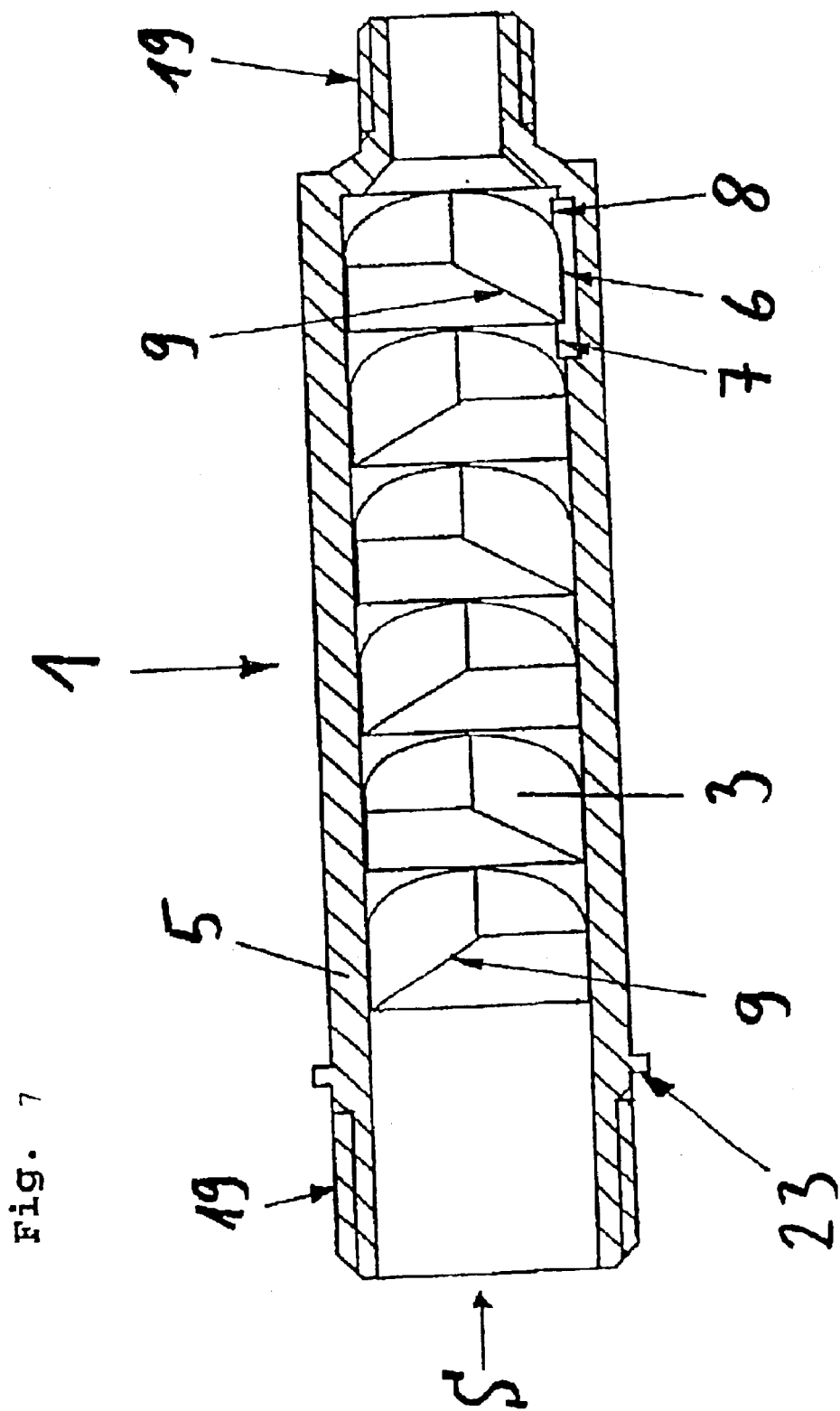
FIG. 7 is a longitudinal section through a static mixer to be screwed onto a threaded bushing with a mixer channel having secondary channels surrounding the last mixer stage.

FIG. 7 is a longitudinal section through another static mixer 1 in which the one-piece mixer channel housing 5 simultaneously forms the mixer housing. In the case shown here as well, the mixer blade element 3 already known from FIGS. 1a, 2a, 3a, 4a and 6 is employed. Unlike the previously mentioned embodiments, the mixer blades 9 of mixer blade element 3 in this static mixer 1 are configured only radially from the mixer channel wall, but are not, however, as in the other examples, supported by the wall in the axial direction by form fit. Mixer blade element 3, together with its last mixer stage, viewed in the direction of flow S, here rests on a collar at the end of the mixer channel of mixer channel housing 5. Mixer channel 5 here is thus designed essentially as an annular cylinder, into the mixer channel of which mixer blade element 3 is axially inserted. As the sectional view shows, the mixer channel wall has, analogously to the mixer in FIG. 3a, grooves 6 extending parallel to the mixer channel axis in the region of the last mixer stage, which grooves, together with the mixer blades 9 of this stage radially adjoining the mixer channel wall, form secondary channels 6 around this mixer stage or around the mixer blades 9 of this mixer stage. The axial extent of grooves 6 is such that they extend beyond the range of the respective mixer blades 9 in the wall region, both in the direction of flow S and against the direction of flow S, thereby forming one or more discharge openings 7 before the last mixer stage, and one or more feeder openings 8 after this stage. Here too, the mixer channel wall is, in other words, designed so that it has bypass channels 6 to divert a partial stream around the mixer blades 9 of the last stage of mixer blade element 3. The function and preferred positioning of channels 6 are identical in this embodiment to that of FIG. 3a. Unlike the previously described solutions, the one-piece mixer channel housing 6 here, in this case also forming the mixer housing, has in the inlet region an external thread 19 with a stop collar 23 for connection to a feeder device. As a result, the precise axial positioning of mixer 1 at the outlet of the feeder device is ensured. The outlet of the mixer is designed as a threaded connector 19, as described previously with regard to FIG. 5a.

Figure 8:
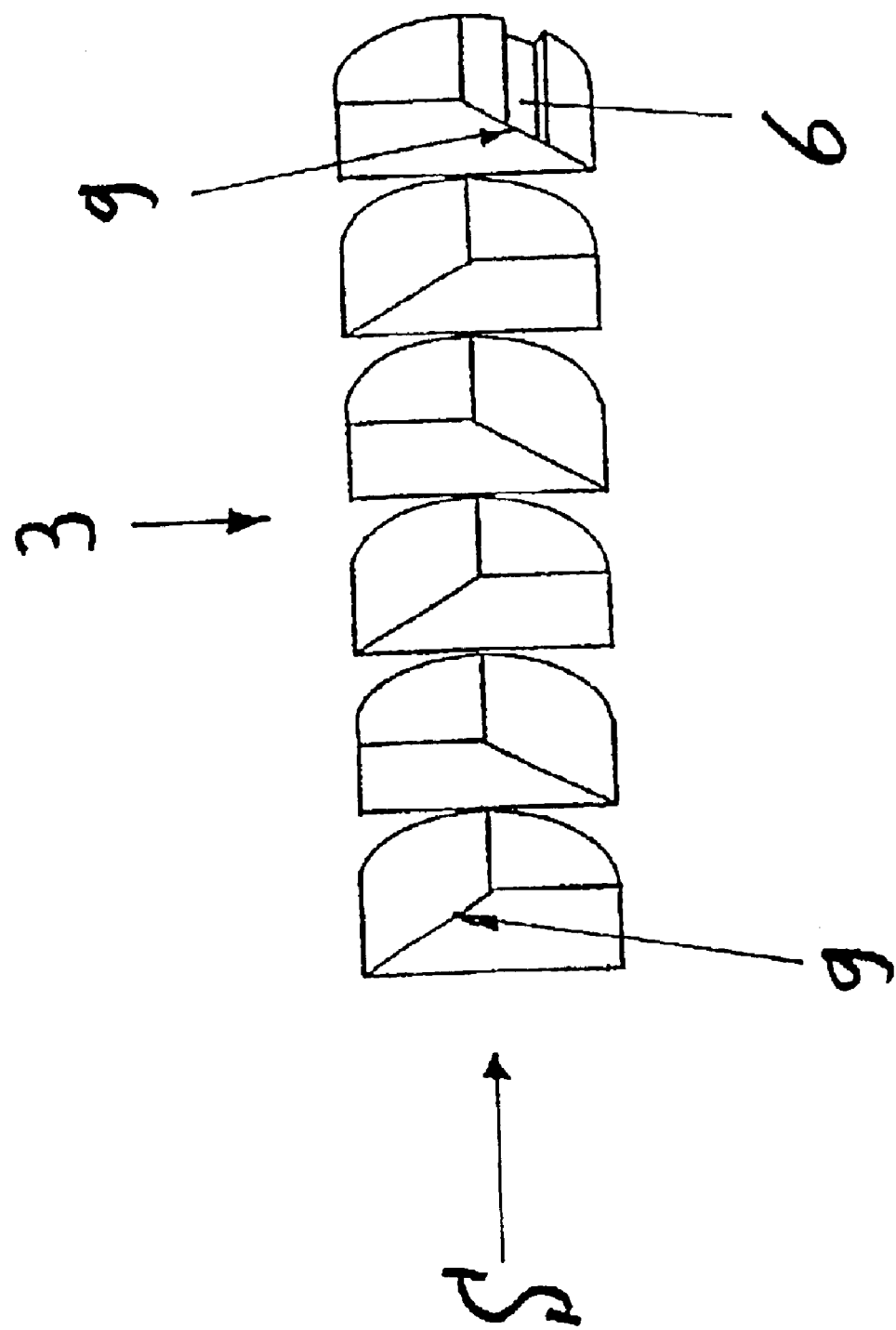
FIG. 8 is a side view of a mixer blade element for a static mixer with passage channels in the last mixer stage.

FIG. 8 is a side view of a one-piece six-stage mixer blade element 3 which is arranged in a cylindrical mixer channel so that the mixer blades 9 radially adjoin the mixer channel wall. It is evident that the mixer blades 9 of the last mixer stage, viewed in the direction of flow S, have passages 6 in the region provided to radially adjoin mixer channel wall which permit the passage of material in the wall region from the front end of the blade to the back end of the blade, thereby providing a bypass 6 for a component partial stream around the respective mixer blades 9. The function of these passages 6 with mixer blade element 8 located in a cylindrical mixer channel is the same as in FIGS. 3a, 3b and 6; however, here the feeder means 6, 7, 8 are obtained essentially by the design of mixer blade element 3—an approach which permits the use of extremely simple and thus inexpensive mixer channel housings 5.

The individual components of the above-described mixers according to the invention are advantageously made of plastic by injection molding since this method permits inexpensive mass production of them, thereby making use of the mixers as single-use mixers economical. It is also possible, however, to make individual parts of the mixer such as housing components 2, 5, or the described mixer channel extension 20, from other materials, specifically metal.

Although the embodiments were described here essentially using the example of mixing highly viscous PU with a hardening accelerator paste, it must be pointed out that the invention is not restricted to this application but is advantageously suited to mixing other reactive materials, or even nonreactive materials, for which there must be assurance that the outer region of the mixing stream is formed by a material of precisely defined composition. If feeder openings 8 are used that have an extent limited circumferentially, then these should be advantageously positioned, taking into account the specific mixing pattern generated by the mixing means 3, 9, 15, axially as close as possible to the outlet of the mixing means and radially on the perimeter of the mixer channel such that the feed takes place where desired material does not advance into the outer region of the mixing stream. Since these regions are dependent on the individual mixer element 3, 9, 15, as was already mentioned, and specifically on the geometry of this element in the outlet section, it is obvious that a precise as well as stable positioning, both axially and radially, between mixing means 3, 9, 15 and feeder openings 8 is indispensable for achieving a good-quality and reproducible result. Appropriate positioning means, positioning keys and stop collars, are familiar to the individual skilled in the art, and are therefore not described in detail.

While this application describes preferred embodiments of the invention, it must be emphasized that the invention is not limited to these but may also be implemented in other ways within the scope of the following claims.

What is claimed is:

1. A method for forming a mixing component stream from a main component mixed completely or partially with one or more additives, the stream being partially or completely jacketed with unmixed main component or an additional component, the method comprising:

mixing a stream of main component and one or more streams of one or more reactive or nonreactive additives using a static mixer element arranged in a mixer channel to create a completely or partially mixed mixing component stream; and adding one or more streams of unmixed main component or an additional component in the mixer channel to the outer region of the completely or partially mixed mixing component stream so as to create a complete or partial jacket of unmixed main component or of an additional component surrounding the mixing component stream;

wherein one or more streams of unmixed main component and an additional component fed in to create the complete or partial jacket are fed in axially, viewed in the direction of flow, directly after the static mixer element to the outer region of the completely or partially mixed mixing component stream.

2. Method according to claim 1, characterized in that the streams fed in to create the complete or partial jacket are composed of unmixed main component and are discharged from the stream of main component and additive flowing in the mixer channel.

3. Method according to claim 1, characterized in that the streams of unmixed main component to create the jacket in the inlet region of the static mixer element (3, 9) are discharged from the stream of main component and additive entering this element, and fed to the mixing component stream in the outlet region of the mixer element (3,9).

4. Method according to claim 1, characterized in that a multistage static mixer element (3, 9) is used, and the streams of unmixed main component fed in for jacketing are discharged in the region between the mixer element stages, specifically, in the region before the penultimate and/or last mixer element stage, viewed in the direction of flow, from the stream of main component and additive traversing these features, and are fed to the mixing component stream after this mixer element stage or these mixer element stages.

5. Method according to claim 1, characterized in that a static mixer element (3, 9) with swirl blades (9) is used, and specifically that layered addition of the additive to main component occurs.

6. Method according to claim 1, characterized in that the main component is a highly viscous single-component adhesive, and the additive is a hardening accelerator, and specifically that the single-component adhesive is PU.

7. Application of the method according to claim 1 to generate an adhesive bead having a core of PU with hardening accelerator added layer-by-layer and having an envelope of unmixed PU for adhesively bonding components together.

* * * * *